(12) United States Patent
Geborek

(10) Patent No.: US 7,422,087 B2
(45) Date of Patent: Sep. 9, 2008

(54) METHOD AND SYSTEM FOR DETECTING VEHICLE ROLLOVER EVENTS

(75) Inventor: Mariusz Geborek, Cracow (PL)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 11/178,901

(22) Filed: Jul. 11, 2005

(65) Prior Publication Data

US 2006/0027412 A1 Feb. 9, 2006

(30) Foreign Application Priority Data

Jul. 19, 2004 (EP) .................................. 04460031

(51) Int. Cl.
*B60K 28/14* (2006.01)
*B62D 49/08* (2006.01)

(52) U.S. Cl. .................. 180/282; 180/290; 701/45; 340/429; 340/440

(58) Field of Classification Search .................. 180/271, 180/282, 286, 290; 701/45, 70; 340/429, 340/440
See application file for complete search history.

(56) References Cited

U.S. PATENT DOCUMENTS

| | | | |
|---|---|---|---|
| 6,292,759 B1 | 9/2001 | Schiffmann | |
| 6,433,681 B1 | 8/2002 | Foo et al. | |
| 6,535,800 B2 | 3/2003 | Wallner | |
| 7,120,528 B2 * | 10/2006 | Salib et al. | 701/45 |
| 7,162,343 B2 * | 1/2007 | Subbian et al. | 701/45 |
| 7,162,350 B2 * | 1/2007 | Kato et al. | 701/70 |
| 7,206,679 B2 * | 4/2007 | Schubert et al. | 701/38 |
| 7,269,483 B2 * | 9/2007 | Schubert et al. | 701/1 |
| 2004/0193352 A1 * | 9/2004 | Ito et al. | 701/70 |
| 2005/0033549 A1 * | 2/2005 | Clark | 702/150 |
| 2005/0102083 A1 * | 5/2005 | Xu et al. | 701/70 |
| 2005/0154509 A1 * | 7/2005 | Schubert et al. | 701/29 |
| 2006/0027412 A1 * | 2/2006 | Geborek | 180/271 |
| 2006/0064218 A1 * | 3/2006 | Subbian et al. | 701/45 |
| 2006/0238026 A1 * | 10/2006 | Lich | 303/191 |
| 2006/0267750 A1 * | 11/2006 | Lu et al. | 340/440 |
| 2007/0010928 A1 * | 1/2007 | Brusarosco et al. | 701/70 |
| 2007/0086624 A1 * | 4/2007 | Breed et al. | 382/104 |
| 2007/0112477 A1 * | 5/2007 | Van Zanten et al. | 701/2 |
| 2007/0260384 A1 * | 11/2007 | Romanchok et al. | 701/70 |

FOREIGN PATENT DOCUMENTS

WO 99/47384 9/1999
WO 03/010034 2/2003

* cited by examiner

*Primary Examiner*—Kevin Hurley
*Assistant Examiner*—Karen J Amores
(74) *Attorney, Agent, or Firm*—Jimmy L. Funke

(57) ABSTRACT

The present invention relates to a method and system for detecting a vehicle rollover or near-rollover event that may precede a rollover of a vehicle. The system comprises controller connected to at least one right and at least one left vehicle tire pressure sensor, performing the assessment of pressure signals on the basis of pressure characteristics corresponding to rollover or near-rollover events, and generating an output activation signal that determines the vehicle rollover or near-rollover event if said assessment is positive. The controller is preferably connected to at least one additional sensor and performs the additional assessment of this sensor signal on the basis of this signal characteristics corresponding to rollover or near-rollover events. The protection devices are activated sequentially, starting with the resetable protection devices, in dependence of estimated rollover confidence.

22 Claims, 5 Drawing Sheets

METHOD AND SYSTEM FOR DETECTING VEHICLE ROLLOVER EVENTS

The present invention relates to a method and system for detecting a vehicle rollover or near-rollover event that may precede a rollover of a vehicle.

Systems of this type are used to deploy occupant protection devices such as seat belts pretensioners, pop-up rollover bars or air bags, especially air bags protecting occupants' heads during a rollover accident.

The majority of the known approaches for detecting vehicle rollover or near-rollover events employ various sensors, signals of which are processed by the rollover algorithm and output activation signal is generated on the basis of the algorithm assessment. Typically the algorithm is implemented as software of the microcontroller, being the part of the same electronic control unit (ECU), that the sensors are installed. Usually the sensors of the ECU include at least one accelerometer, measuring the lateral or vertical acceleration of the vehicle, and angular rate sensor (ARS), measuring the roll rate of the vehicle around its longitudinal axis. These types of systems are often called "Standalone Rollover Detection Modules". Examples of such modules are disclosed in U.S. Pat. No. 6,433,681, U.S. Pat. No. 6,535,800, U.S. application Ser. No. 10/319,325 or publication WO 03/010034. Other systems, like these disclosed in international publication WO 99/47384 or U.S. Pat. No. 6,292,759 take an advantage of other signals provided by external sensors already installed in the vehicle, e.g. the vehicle velocity provided by the speedometer, occupant presence signal or steering wheel angle. All these disclosures are incorporated herein by reference and may be used to clarification of certain aspects not described herein in detail.

The above systems however require at least an ARS sensor which influences the cost of overall system.

The object of the present invention is to provide an uncomplicated and inexpensive method and system for detecting vehicle rollover or near-rollover event, which in particular employ only the signals from existing vehicle sensors, and which may be easily implemented in existing vehicle microcontroller or other system.

Another object of the present invention is to provide a method and system for detecting a vehicle rollover or near-rollover event which may be applied as an additional safing or arming system into existing rollover detection arrangements.

Yet another object of the present invention is to provide a method and system for sequential activation of different types of protection devices, including resetable protection devices (like seatbelt pretensioners or rollover bars) in dependence of estimated rollover confidence.

According to the present invention there is provided a method of detecting a vehicle rollover or near-rollover event, comprising the steps of measuring the pressures of at least one right vehicle tire and at least one left vehicle tire, performing the assessment of said pressures on the basis of pressure characteristics corresponding to rollover or near-rollover events, and generating output activation signal that determines the vehicle rollover or near-rollover event if said assessment is positive.

The assessment of said pressures preferably includes comparing each pressure against the first threshold and the second threshold that is higher than the first threshold, and the assessment is positive when simultaneously at least one left tire pressure is below the first threshold and at least one right tire pressure exceeds the second threshold; or if simultaneously at least one right tire pressure is below the first threshold and at least one left tire pressure exceeds the second threshold. Preferably according to the present invention, the conditions of said positive assessment should occur in predefined time window.

Alternatively the assessment of said pressures beneficially includes measuring a moving average of a number of differences between subsequent left and right tire pressure samples and the assessment is positive when said average exceeds the predefined threshold.

The assessment of said pressures may also preferably include comparing of the measured pressures characteristics registered in predefined time window against stored pressure templates representing models of rollover or near-rollover events and the assessment is positive if the measured pressures correspond, with predefined precision, to at least one of said templates.

Stored templates are advantageously obtained by computer simulations, recorded during real rollover events and/or forecasted by experts.

Prior generating output activation signal the method advantageously comprises the step of performing the additional assessment of at least one other signal on the basis of this signal characteristics corresponding to rollover or near-rollover events.

Said other signals include vehicle accelerations signals.

It should be noted that said assessments parameters i.e. thresholds, precision and/or the length of the time window, within which the assessments are performed, may be either fixed or dynamically updated during operation of the vehicle.

Dynamical updating is advantageously a function of nominal pressure of each tire, low pass filtered pressure of each tire, vehicle velocity, linear acceleration, technical parameters of the vehicle, shape of the pressure plot in predefined time window and/or weight distribution of the vehicle.

The pressure signals are preferably preprocessed, where preprocessing involves at least low pass filtering, noise removing and pressure signal drift removal.

The method of the present invention beneficially comprises the additional step of activation of at least one protection device for an occupant of the vehicle, where the signal activating said protection devices may be additionally processed e.g. logically ANDed with another activation signal provided by auxiliary safing algorithm.

The protection devices may advantageously be activated sequentially, starting with the resetable protection devices, in dependence of estimated rollover confidence.

According to another aspect of the present invention there is provided a system of detecting a vehicle rollover or near-rollover event, comprising a controller connected to at least one right and at least one left vehicle tire pressure sensor, performing the assessment of pressure signals on the basis of pressure characteristics corresponding to rollover or near-rollover events, and generating an output activation signal that determines the vehicle rollover or near-rollover event if said assessment is positive.

The controller may be preferably connected to at least one additional sensor and may perform the additional assessment of this sensor signal on the basis of this signal characteristics corresponding to rollover or near-rollover events.

Said additional sensors beneficially include accelerometer and/or speedometer.

The system is advantageously connected with at least one protection device for an occupant of a vehicle and said output activation signal is a direct signal to activate said protection devices or is additionally processed before activation of said protection devices.

Said protection devices may of course be activated sequentially, starting with the resetable protection devices, in dependence of estimated rollover confidence.

The invention is presented below in details with reference to exemplary embodiments and drawings on which:

Figure 1:
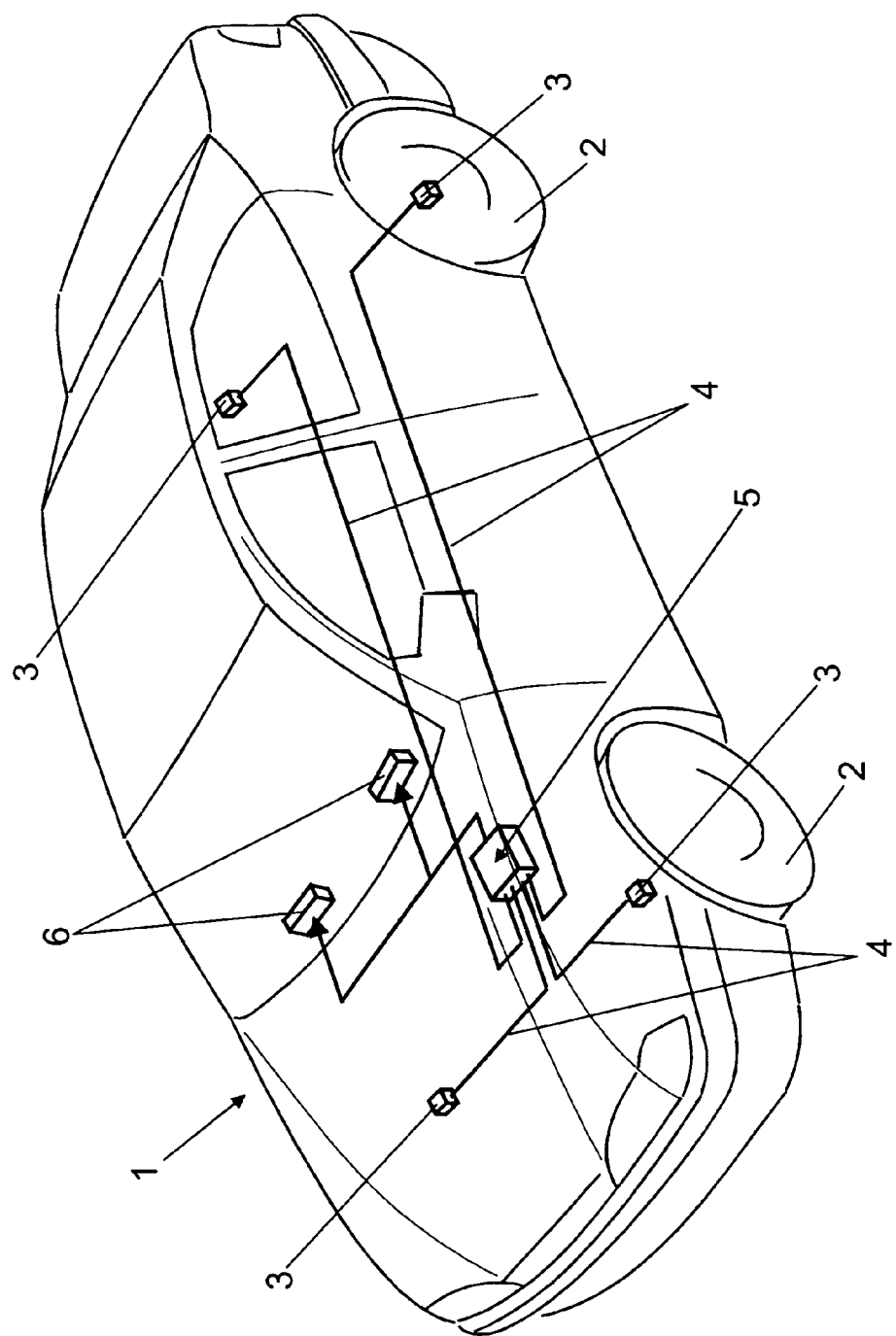
FIG. 1 is a perspective view of a vehicle with the main components of the system according to the present invention.

The general idea of the rollover detection approach, according to the present invention, is illustrated in FIG. 1 which schematically shows a vehicle body 1. As shown each tire 2 of the vehicle is coupled with tire pressure sensor 3. Signals 4 of sensors 3, corresponding to the measured tire 2 pressures are transmitted to microcontroller 5, where the rollover detection algorithm operates. The microcontroller processes the signals performing their assessment on the basis of pressure characteristics corresponding to rollover or near-rollover events.

An example of tire pressure sensors 3 are integrated sensors Motorola MPXY8020A, having the dynamic response with respect for changes of the pressure negligible as compared to duration of rollover events; usually in the range of 300 ms (fast rollover event, e.g. curb trip) to 1000 ms (slow rollover event, e.g. fall over into the ditch). The typical range of the tire pressure values available on communication bus (CAN) in case of a motor car is 0-4.0 bar with resolution of 0.05 bar, which is even more than sufficient for the purposes of the invention. It is worth noting that many modern vehicles are factory equipped with tire pressure sensors used to detect the puncture of the tire and helping driver to maintain the optimal pressure of tires. Hence it is possible to upgrade the existing vehicle protection systems, already connected with tire pressure sensors by rollover detection approach of the invention, only through the implementation of the algorithm in existing microcontroller.

The rollover assessment includes comparing time-dependent fluctuations of tire pressures with pressure templates stored in library of rollover events, previously forecasted by experts, recorded during real rollover events or being a result of computer simulations; comparing the measured pressures against individually selected thresholds; performing the moving average analysis, and/or performing other types of calculations, selected types of which are described in further part of this document with reference to exemplary embodiments of the invention. In case the assessment is positive, the microcontroller 5 generates an output activation signal, indicating the rollover or near-rollover event, which directly deploys an appropriate protection device 6 for the occupant of the vehicle and/or is delivered to other electronic systems of the vehicle.

Figure 2:
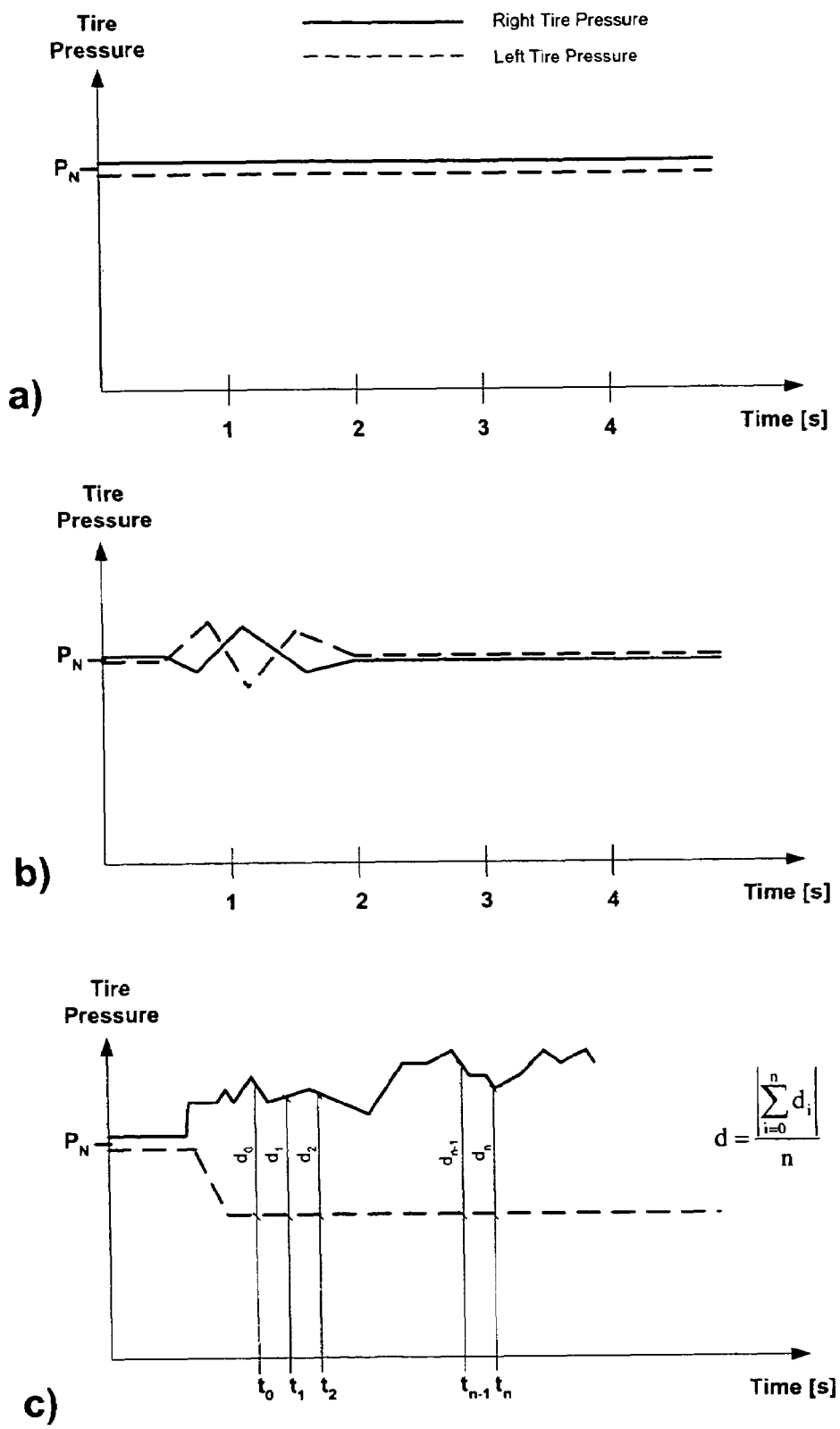
FIGS. 2a, 2b and 2c are typical time dependent plots of tire pressure fluctuations of a vehicle right and left tires during parking, driving and rollover event respectively.

Typical pressure characteristics of vehicle tires, during parking, driving and rollover event are schematically shown in FIG. 2.

As shown in FIG. 2a, when the car is parked, the pressures in all tires are close to the nominal pressure value $P_N$. The pressures in left and right tires may differ due to the vehicle inclination, inconsistent load of the vehicle, as well as other factors, yet these differences are negligible, as compared to the nominal pressure value $P_N$.

While the car is driving, the pressure oscillates around the nominal pressure value $P_N$, what is schematically presented in FIG. 2b. Obviously, because of road surface, various driver manoeuvres and other dynamical forces the pressures of left and right tires are subjected to slight changes. The pressures vary around the nominal pressure value $P_N$ and usually do not take place in longer periods of time. In this example, we may observe that between 0.5 s and 2.0 s the vehicle was driven on bumpy road.

Exemplary fluctuations of tire pressures during rollover event are presented in FIG. 2c. As shown, the rollover event is characterised in fact that wheels of the same side of the car, in this example left side wheels, are lifted up and consequently the pressure in left tires quickly drops and in short time stabilizes at constant value, which is lower than the nominal pressure $P_N$. At the same time the pressure in remaining right side tires, is higher than the nominal value, as the whole weight of the vehicle is directed into this side of the vehicle. The pressure of right, loaded tires oscillates due to the dynamic nature of the rollover but is larger than the pressure of left, lifted up tires. If increased pressure and/or high-pressure peaks are detected on one side of the vehicle and on the other side the pressure significantly drops, the vehicle is most likely rolling over. This example assumes that there is no pressure drop due to the tire damage like nail or screw in the tire. According to the invention detection of scenarios like slow pressure drop is detected by preprocessing modules. Once unreliable signals are detected, the rollover detection algorithm can be disabled to avoid improper operation.

Figure 3:
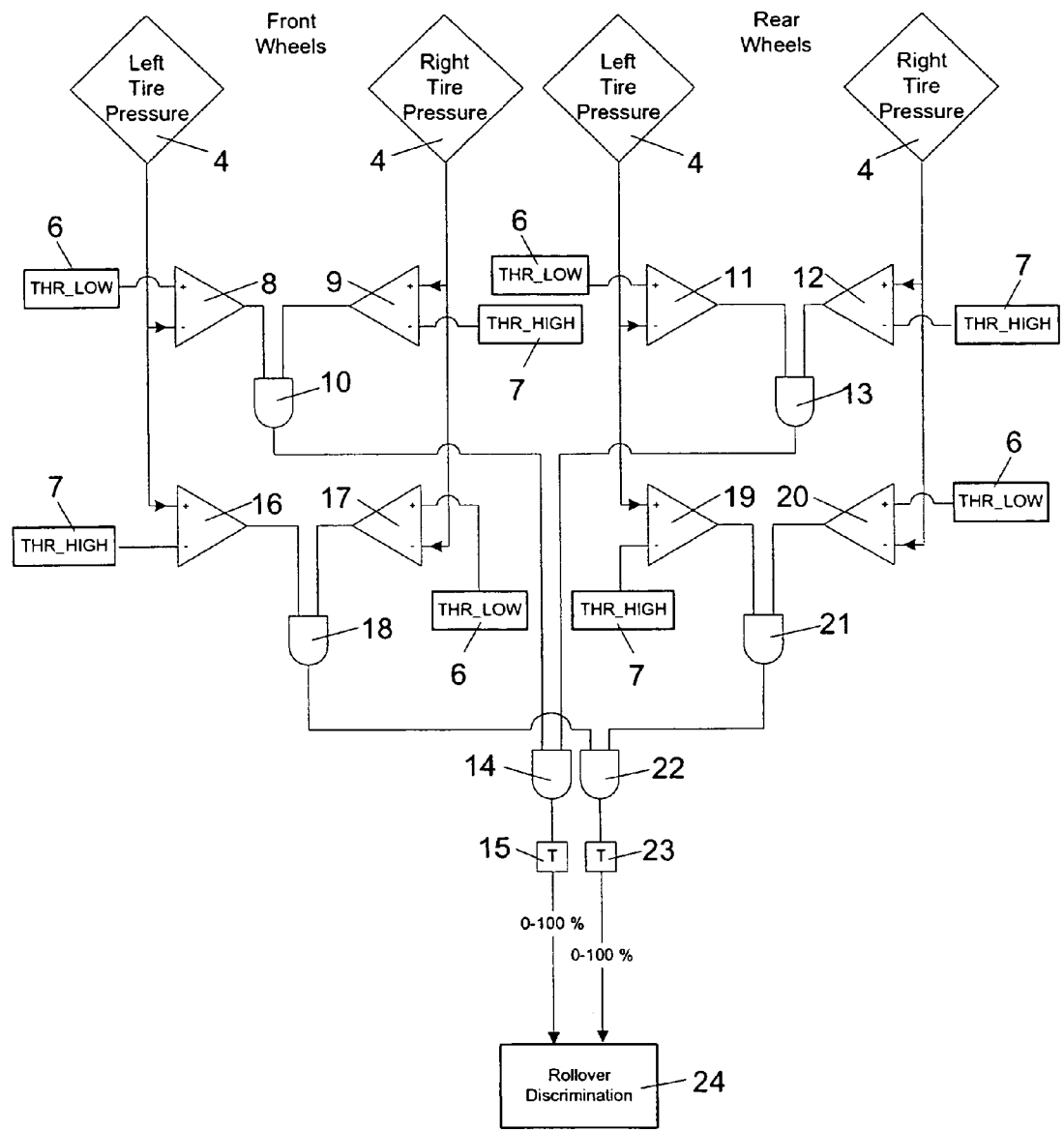
FIG. 3 is a block and circuit diagram of one embodiment of the present invention.

FIG. 3 shows an example implementation of rollover detection algorithm, according to the present invention. The input signals 4 are provided by front and rear tire pressure sensors 3 (cf. FIG. 1). As shown on Fig. 3, the operation of the algorithm is realized in two separated, parallel paths, corresponding to front and rear wheels 2 (cf. FIG. 1) of the vehicle. The algorithm compares all pressure signals 4 with the first threshold 6 (THR_LOW) and the second threshold 7 (THR_HIGH) that is higher than the first threshold, in a manner described below.

In this embodiment the THR_LOW was set to 2.0 bar, THR_HIGH to 2.4 bar and the nominal pressure $P_N$ was 2.2 bar.

If the left front tire pressure is below the first threshold 6 and simultaneously the right front tire pressure exceeds the second threshold 7 the comparators 8 and 9 are activated and consequently the AND gate 10 provides an activation signal. If at the same time left rear tire pressure is below the first threshold 6 and simultaneously the right rear tire pressure exceeds the second threshold 7 the comparators 11 and 12 are activated and the AND gate 13 provides an activation signal. If both gates 10 and 13 are active, another AND gate 14 deploy an activation signal, which is an input of the timer module 15.

The timer module 15 continuously checks whether the activation conditions are constantly present during pre-defined time window. In this example the timer module 15 starts operating each time the AND gate 14 changed the state to "active" (binary 1), and checks for how long the gate remains active. If left wheels are lifted up and right wheels are loaded for sufficiently long time, the timer module 15 shall transmit the activation signal indicating the right rollover of a vehicle. In this embodiment the activation signal varies within the range 0.0 to 1.0 (0-100%), corresponding to the rollover confidence, proportionally to the duration of the activation state of the gate 14. The zero activation signal of the timer 15 denotes lack of activation of the gate 14 and the 100% activation corresponds to a situation when the gate 14 has been active for 1000 ms Activation signal of the timer 15 is the input of the rollover discrimination block 24, which in dependence of the activation signal value deploys an appropriate protection device, which in case the activation signal is greater than 20% shall be resetable seatbelts, greater than 70% shall be rollover bars and in case the activation signal is greater than 90% shall be airbags.

It should be understood that the time window of the timer module 15 may be fixed e.g. within the range of about 100 ms to about 1000 ms, in which case only one activation signal shall be provided, or the length of the time window may be dynamically updated during the vehicle operation. Such dynamic adjustment may be based on the information about the road surface, driving conditions, averaged value of tire pressures in predefined time window, etc. The purpose of such adjustments is to make the algorithm more or less sensitive, depending on the environment conditions. As a result, better trade off can be achieved between incorrect rollover discrimination, that may result in inadvertent protection device deployment, and either delayed or lack of rollover discrimination.

The schema corresponding to described above takes place also for left rollover of a vehicle i.e. where right wheels are lifted up and left wheels are loaded, in which case the comparators 16 and 17 and the AND gate 18 corresponding to the front wheels and simultaneously the comparators 19 and 20 and the AND gate 21 become active, thus activating the AND gate 22, output of which is an input of the timer module 23. The principle of operation of the timer module 23 is the same as the timer module 15.

The thresholds 6 (THR_LOW) and 7 (THR_HIGH) may be constant values or may be dynamically adjusted during operation of the vehicle. Such adjustment allows taking into account the changes of the nominal pressure of each tire, caused e.g. by the temperature influence, as well as velocity of the vehicle, lateral acceleration of the vehicle, weight distribution and other circumstances taking place during the operation of the vehicle. The thresholds may also be updated on the base of the tire pressure diagnostic results. Thus, for example, the fact that the tires are not symmetrically filled with the air (different pressures in tires during parking) shall not degrade rollover detection performance.

Figure 4:
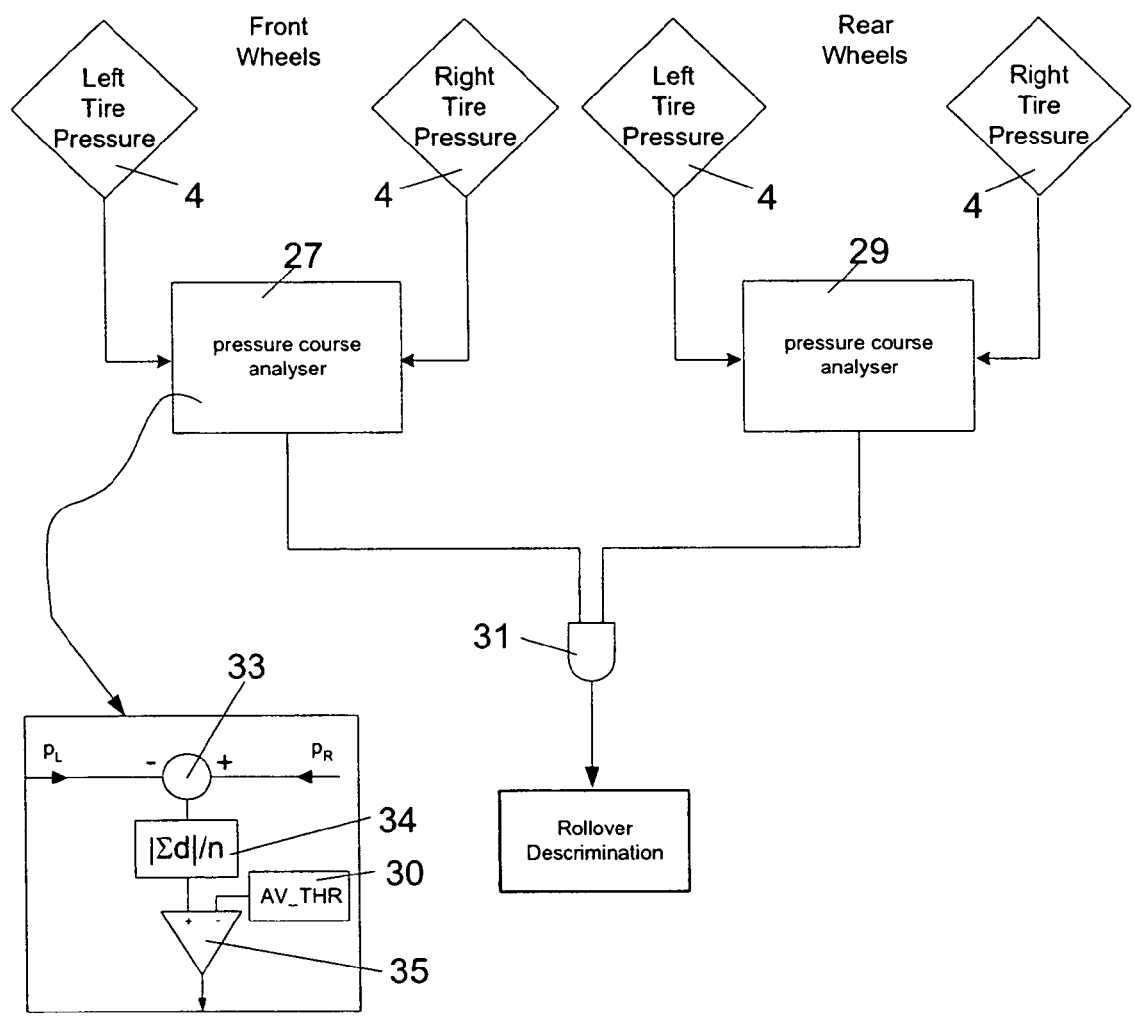
FIG. 4 is a block and circuit diagram of another embodiment of the present invention.

FIG. 4 shows another embodiment of a rollover detection algorithm, according to the present invention. Similarly as in embodiment of FIG. 3 the input signals 4 of the algorithm are provided by front and rear tire pressure sensors 3 and similarly the algorithm operates in two separated, parallel paths, corresponding to front and rear wheels 2 of the vehicle. Here the pressure assessment is realized in modules 27 and 29 corresponding to the front and rear wheels 2 of the vehicle. Concurrent activation of these two modules leads to activation of AND gate 31, which may deploy an appropriate protection device for the occupant of the vehicle or provide rollover discrimination signal to other car systems.

The module 27 is comprised of a differential node 33, to which left $p_L$ and right $p_R$ tire pressure signals are delivered; a block 34 calculating the moving average value of the absolute pressure differences and a comparator 35.

The moving average is calculated according to the formula:

$$d = \frac{\left|\sum_{i=0}^{n} d_i\right|}{n}$$

where $d_i=(p_L-p_R)$ is the pressure difference, n denotes the number of subsequent, backward counted, pressure samples corresponding to the length of the time window in which the pressure differences are calculated, i=0 is an index of the most recent sample (cf. FIG. 2c). The length of the time window (n) may be individually adjusted for each application and fixed. Otherwise it may be dynamically updated during the operation of the vehicle, taking into account e.g. the vehicle velocity, the vehicle linear acceleration and/or other parameters of the vehicle. In this embodiment n=500 and the sampling rate is set to 1000 Hz. The absolute value of the differences is provided due to the symmetry of the rollover event. Thus contrary to the solution shown in FIG. 3 only two rollover estimation modules are required. If the value d calculated by the block 34 is greater than the threshold value 30 (AV_THR) the comparator 35 is activated, indicating that either left or right rollover of the vehicle.

The principle of operation of the module 29 is similar to that of module 27.

It should be appreciated by persons skilled in the art the above implementations do not require any numerically complicated calculations, or large amount of memory and can be easily realised by means of the few simple logic elements.

Other implementations of the pressure course analyser, not described in greater details, may base on the shape of the pressure course obtained by registering certain number of consecutive samples forming the time window. In such unit the analysis of measuring pressure values may comprise comparing course of registered pressure changes against many standard templates of pressure changes courses that characterise many cases of rollover event and generating an output activation signal when registered course of pressure changes corresponds, at required precision, with at least one stored standard course. All the standards of pressure changes courses may be stored in the non volatile memory (e.g. EEPROM) of the microcontroller, where algorithm is implemented. The length of the time window may be fixed or may be continuously updated by the adaptation algorithm which may take into account many additional conditions, like inequality of weight distribution, tire pressure drop, etc. The adaptation algorithm may also limit the number of standards used in the process of comparison in order to make operation of algorithm faster and more reliable.

Figure 5:
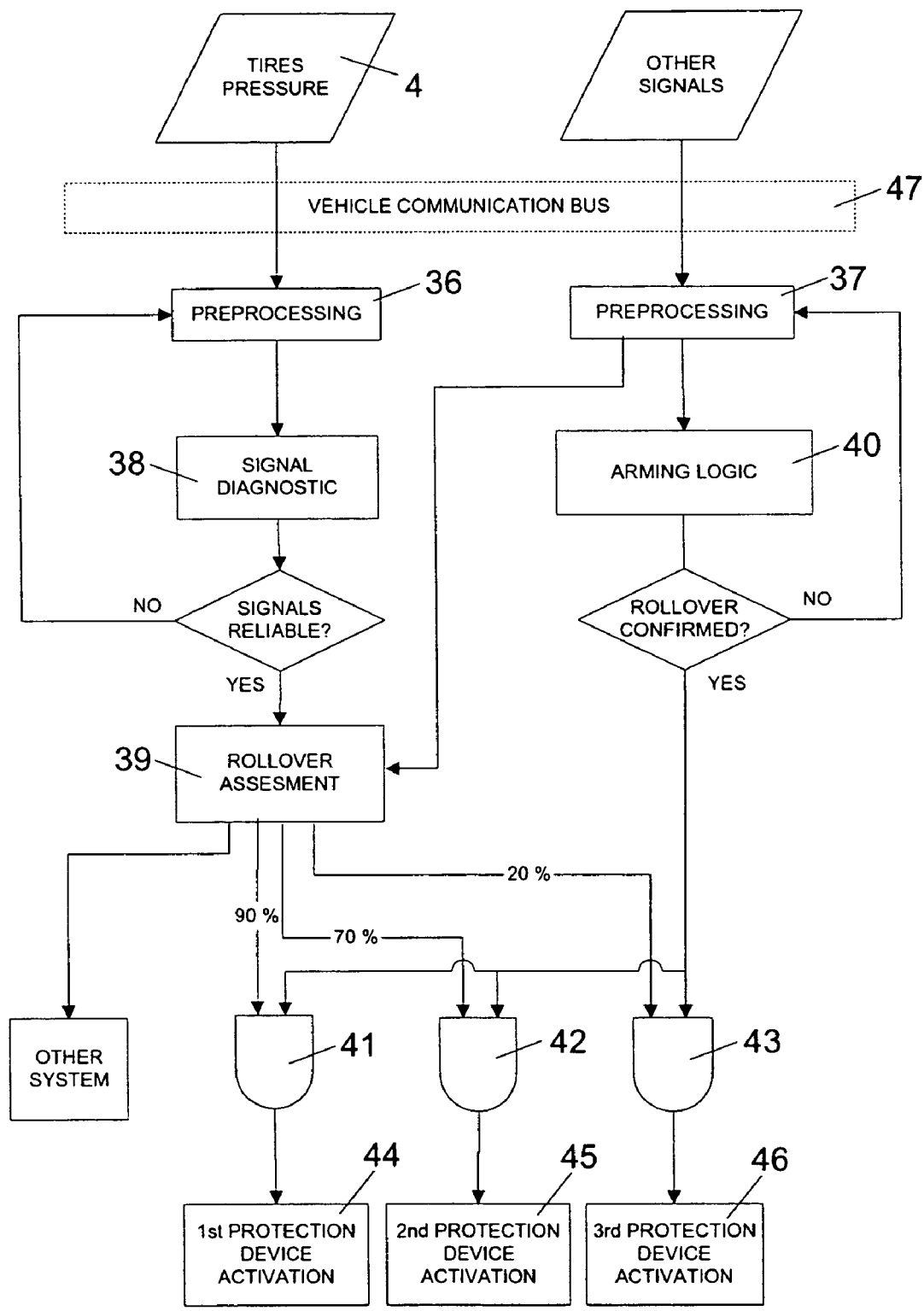
FIG. 5 is a block and circuit diagram of yet another embodiment of the present invention.

FIG. 5 depicts a diagram of an exemplary microcontroller implementation of the invention. In the first step of algorithm operation the required signals are preprocessed in blocks 36 and 37 in order to remove the noise and the pressure signal drift and to perform the low pass filtering. Block 36 initiates the first processing path, while the block 37 initiates the second arming path and provides additional signals to block 39.

Signals of the first path, after preprocessing, are delivered to the diagnostic block 38 where they are analysed with respect to their accessibility and reliability. If the analysis is negative i.e. one or more signals are out of predefined range, the block 38 disables potential activation of protection devices not transferring the signals or transferring zero signals values for further processing.

If the analysis of the block 38 is positive, signals are delivered to the rollover assessment block 39, which estimates the rollover confidence as a value within 0 to 100%. The block 39 may be implemented in manner similar to these described above, with reference to FIG. 3 or FIG. 4. In this example the block 39 comprises four outputs wherein each output corresponds to individual threshold of the rollover confidence in excess of which it becomes active. Exemplary value of these thresholds, depending on the type of protection device, may be 20% for resetable seatbelts, 70% for rollover bars and 90% for airbags. As shown the rollover discrimination confidence is also delivered to other vehicle systems.

Other preprocessed signals, like vehicle speed, steering angle value and/or linear acceleration values, are also delivered to the block 39. Owing to this, the value of rollover confidence may be additionally modified for more precise determination of driving conditions.

It is also advantageous that block 39 may also detect airborne conditions of the vehicle. As airborne condition (all tires have lost the contact with road surface) is also present during rollover events, additional signals should be used to properly discriminate if airborne or rollover event is present.

Block 39 can realize more than one independent rollover detection processing paths, for example:
- detection of rollover event on the base of the tire pressure asymmetry, as in case of embodiments presented in FIG. 3 and FIG. 4,
- detection of rollover event on the base of the high lateral acceleration value (e.g. greater than 3 g), followed by airborne condition (sudden pressure drop in all tires),
- detection of rollover event on the base of the vertical and/or lateral low-G accelerometer value changes, followed by airborne condition (sudden pressure drop in all tires), In general, block 39 can combine tire pressure characteristics with other signals available in the vehicle to make the rollover event prediction more accurate.

To avoid inadvertent, and in some cases dangerous, activations of protection devices, the activation of each protection device occurs only when, apart from exceeding of rollover confidence threshold, the rollover event occurrence is confirmed by an additional arming logic 40. The arming logic 40 may be implemented in many ways which are known for skilled in the art (e.g. disclosed in U.S. application Ser. No. 09/769,037). As in almost all modern cars lateral and longitudinal high-G accelerometer is present (usually as dual axis device) for detection of side, front and rear impacts to deploy airbags, it is reasonable to use the lateral acceleration exceeding predefined threshold as a minimum arming signal, what can be done at no cost. The coincidence of these two conditions is signaled at the outputs of three AND gates 41, 42 and 43 which are connected directly to the particular protection devices 44, 45 and 46.

In this example, all required signals (including tire pressure values) are delivered through the vehicle communication bus 47.

The presented rollover detection approach may be embodied in all kind of cars, especially in these already equipped with the pressure sensors. The costs of such embodiment are relatively low as only an additional microcontroller need to be installed in the system or even at no hardware cost at all if the algorithm is to be implemented in existing microcontroller of the vehicle (e.g. body computer or other ECUs). The arrangement of the present invention allows detecting a rollover in an early stage thereof.

It is obvious that many parameters and factors need to be properly chosen in order to implement the rollover detection system according to the present invention in a given vehicle. Such factors include but not limit to the weight, geometry and type of the vehicle, installed protection devices, centre of gravity and presence of other rollover detection systems, in which case the system of the invention may operate merely as auxiliary safing logic. These and other factors however should not be considered as limiting the spirit of the invention, the intended scope of protection of which is indicated in appended claims.

The invention claimed is:

1. A method of detecting a vehicle rollover or near-rollover event for a vehicle comprising the steps of:
    measuring a pressure of a right vehicle tire to obtain a right tire pressure measurement;
    measuring a pressure of a left vehicle tire to obtain a left tire pressure measurement;
    comparing the right tire pressure measurement to a first pressure threshold and a second pressure threshold, wherein the second pressure threshold is higher than the first pressure threshold;
    comparing the left tire pressure measurement to the first pressure threshold and the second pressure threshold; and
    determining a positive vehicle rollover or near-rollover event when the left tire pressure measurement is below the first pressure threshold and the right tire pressure measurement exceeds the second pressure threshold or when the right tire pressure measurement is below the first pressure threshold and the left tire pressure measurement exceeds the second pressure threshold; and
    generating an output activation signal in response to a positive determination of a vehicle rollover or near-rollover event.

2. A method in accordance with claim 1, wherein the step of determining a vehicle rollover or near-rollover event comprises:
    measuring a series of left tire measurements and right tire measurements;
    for corresponding left tire measurements and right tire measurements within the series, determining a pressure difference between left tire pressure measurement and right tire pressure measurement;
    calculating a moving average based of the pressure differences made within a predefined time window;
    comparing said moving average to a predefined threshold; and
    determining a positive vehicle rollover or near-rollover event when said moving average exceeds said predefined threshold.

3. A method in accordance with claim 2, further comprising storing a plurality of stored pressure templates representing models of rollover or near-rollover events and determining a positive vehicle rollover or near-rollover event said measured pressure characteristics correspond to at least one of said stored pressure templates.

4. A method in accordance with claim 3, wherein said stored pressure templates are based upon computer simulations.

5. A method in accordance with claim 1, further comprising assessing at least one additional signal to determine rollover or near-rollover events prior to generating an output activation signal.

6. A method in accordance with claim 5, wherein said assessing is based upon a vehicle acceleration signal and a vehicle speed signal.

7. A method in accordance with claim 6, further comprising preprocessing said vehicle acceleration signal and said vehicle speed signal.

8. A method in accordance with claim 7, wherein said preprocessing includes low pass filtering and removal of noise and pressure signal drift.

9. A method in accordance with claim 1, wherein said first and second pressure thresholds are dynamically updated during operation of the vehicle.

10. A method in accordance with claim 9, wherein said dynamical updating is a function of at least one parameter chosen from the group consisting of nominal pressure of the right vehicle tire or the left vehicle tire determined as an average pressure value in predefined time window, a vehicle velocity, a history of the tire pressure values, a linear acceleration and a weight distribution of the vehicle.

11. A method as claimed in claim 1, further comprising activating at least one occupant protection device in the vehicle in response to the output activation signal.

12. A method as claimed in claim 11, wherein said output activation signal is additionally processed based on rollover confidence before activation of said protection device.

13. A method as claimed in claim 12, wherein said protection device is one of a plurality of protection devices that are activated sequentially and is resetable.

14. A system for detecting a vehicle rollover or near-rollover event in a vehicle comprising:
   a right tire pressure sensor coupled to a right vehicle tire for measuring pressure therein and providing a right tire pressure signal indicative of the right tire pressure measurement;
   a left tire pressure sensor coupled to a left vehicle tire for measuring pressure therein and providing a left tire pressure signal indicative of left tire pressure measurement; and
   a controller connected to the right tire pressure sensor and the left tire pressure sensor for receiving the right tire pressure signal and the left tire pressure signal, said controller comprising means for
   comparing the right tire pressure measurement to a first pressure threshold and a second pressure threshold, wherein the second pressure threshold is higher than the first pressure threshold;
   comparing the left tire pressure measurement to the first pressure threshold and the second pressure threshold;
   determining a positive vehicle rollover or near-rollover event when the left tire pressure measurement is below the first pressure threshold and the right tire pressure measurement exceeds the second pressure threshold or when the right tire pressure measurement is below the first pressure threshold and the left tire pressure measurement exceeds the second pressure threshold; and
   generating an output activation signal when a positive vehicle rollover or near-rollover event is determined.

15. A system as claimed in claim 14, wherein the controller is connected to at least one additional sensor for receiving at least one additional signal and is configured for using said one additional signal in determining the presence of a positive vehicle rollover or near-rollover event.

16. A system as claimed in claim 15, wherein said at least one additional sensor includes an accelerometer or a speedometer.

17. A system as claimed in claim 16, wherein the controller is further configured for preprocessing the additional signal.

18. A system as claimed in claim 17, wherein the preprocessing includes low pass filtering, noise removal and drift removal.

19. A system as claimed in claim 14, further comprising a vehicle occupant protection device connected to the controller and adapted to receive the output activation signal.

20. A system as claimed in claim 19, wherein said output activation signal is additionally processed before activation of the occupant protection device.

21. A system as claimed in claim 19, wherein said output activation signal is a signal to activate said occupant protection device.

22. A system as claimed in claim 19, wherein said protection device is one of a plurality of protection devices that are activated sequentially, and is resetable.

* * * * *